(12) United States Patent
Fourneron et al.

(10) Patent No.: US 9,341,171 B2
(45) Date of Patent: May 17, 2016

(54) GAS COMPRESSION SYSTEM

(75) Inventors: Yannick Fourneron, Vandeins (FR); Eric Pinton, Echirolles (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 574 days.

(21) Appl. No.: 13/883,065

(22) PCT Filed: Oct. 28, 2011

(86) PCT No.: PCT/EP2011/068996
§ 371 (c)(1),
(2), (4) Date: Jul. 17, 2013

(87) PCT Pub. No.: WO2012/059427
PCT Pub. Date: May 10, 2012

(65) Prior Publication Data
US 2013/0287598 A1    Oct. 31, 2013

(30) Foreign Application Priority Data
Nov. 5, 2010 (FR) ...................... 10 59173

(51) Int. Cl.
*F04B 9/08* (2006.01)
*F04B 9/12* (2006.01)
(Continued)

(52) U.S. Cl.
CPC . *F04B 9/08* (2013.01); *F02B 37/00* (2013.01); *F02B 37/005* (2013.01); *F04B 9/12* (2013.01); *F04B 9/1235* (2013.01); *F04B 49/08* (2013.01); *F04B 2205/01* (2013.01)

(58) Field of Classification Search
CPC ................. F04B 35/002; F04B 35/008; F04B 9/12–9/1378; F04B 17/05; F02B 63/06; F02B 37/12; B60K 6/08; B60K 6/12; B60K 2006/123; B60K 2006/126
USPC ............ 180/165; 60/280, 602, 620, 625–628, 60/613–615; 123/676, 684, 198 C; 417/46, 417/47, 380, 381, 385, 388, 379, 384
See application file for complete search history.

(56) References Cited

U.S. PATENT DOCUMENTS 2,849,173 A * 8/1958 Surdy ................. F02B 29/0406
417/203
3,204,859 A * 9/1965 Crooks ................. F02B 37/164
235/91 R
(Continued)

FOREIGN PATENT DOCUMENTS

CH        389 407        3/1965

OTHER PUBLICATIONS

International Search Report as issued for PCT/EP2011/068996.

*Primary Examiner* — Alexander Comley
(74) *Attorney, Agent, or Firm* — Pillsbury Winthrop Shaw Pittman LLP

(57) ABSTRACT

A gas compression system includes at least one first compressor provided with at least one first cylinder and one second cylinder that are combined together such that a gas to be compressed, which is taken into the first cylinder at an intake pressure, is compressed by the intake of an engine gas to the second cylinder. The system further includes a pressure checking device to check the pressure of the engine gas during the feeding thereof into the second cylinder. The pressure checking device includes a pressure detector for measuring the pressure of the gas to be compressed during the intake thereof to the first cylinder; and a regulator for adjusting the flow rate of the engine gas in the second cylinder such that the pressure of the gas to be compressed is constant during the intake thereof to the first cylinder.

8 Claims, 2 Drawing Sheets

Figure 1:
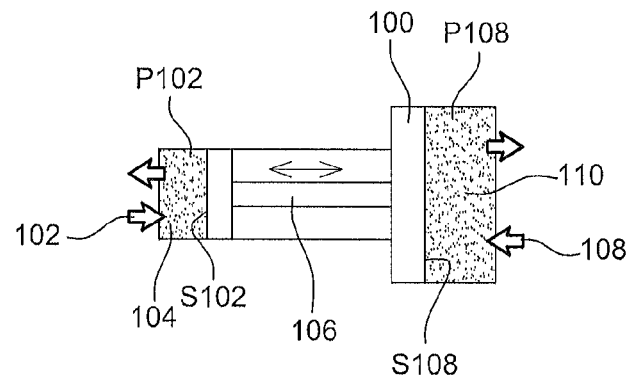

(51) Int. Cl.
*F04B 9/123* (2006.01)
*F04B 49/08* (2006.01)
*F02B 37/00* (2006.01)

(56) References Cited

U.S. PATENT DOCUMENTS

| | | | | | |
|---|---|---|---|---|---|
| 3,365,014 | A | * | 1/1968 | Clingerman | F02B 33/00 123/198 C |
| 3,790,310 | A | * | 2/1974 | Whelan | F04B 45/04 417/388 |
| 3,990,242 | A | * | 11/1976 | Muller | F02B 73/00 60/280 |
| 4,051,877 | A | * | 10/1977 | Fletcher | F04B 9/127 141/197 |
| 4,104,008 | A | * | 8/1978 | Hoffmann | F01L 25/063 417/397 |
| 4,205,638 | A | * | 6/1980 | Vlacancinch | F04B 31/00 123/19 |
| 4,502,848 | A | * | 3/1985 | Robertson | F04B 35/002 417/380 |
| 4,527,634 | A | * | 7/1985 | Lee | A62C 35/023 169/13 |
| 4,606,708 | A | * | 8/1986 | Clark | F02B 75/04 417/380 |
| 4,685,510 | A | * | 8/1987 | Priem | F02G 1/02 165/62 |
| 4,730,990 | A | * | 3/1988 | Priem | F02G 1/02 417/364 |
| 4,777,801 | A | * | 10/1988 | Porter | F01B 11/007 417/380 |
| 4,798,053 | A | * | 1/1989 | Chang | B60K 6/12 180/165 |
| 4,811,558 | A | * | 3/1989 | Baugh | F04B 25/00 417/267 |
| 4,884,405 | A | * | 12/1989 | Schatz | F01B 11/007 417/380 |
| 5,302,090 | A | * | 4/1994 | Schoo | F04B 9/133 417/379 |
| 5,324,175 | A | * | 6/1994 | Sorensen | F04B 9/133 417/254 |
| 5,490,766 | A | * | 2/1996 | Zeck | F04B 9/127 137/101.11 |
| 5,505,593 | A | * | 4/1996 | Hartley | F01B 11/004 417/393 |
| 5,702,238 | A | * | 12/1997 | Simmons | F01B 9/023 417/380 |
| 5,785,505 | A | * | 7/1998 | Price | F01M 1/02 123/71 R |
| 6,554,585 | B1 | * | 4/2003 | Maracchi | F02B 71/04 123/46 R |
| 6,568,186 | B2 | * | 5/2003 | Zaleski | F01B 29/04 60/39.6 |
| 6,922,997 | B1 | * | 8/2005 | Larson | B60K 6/12 60/597 |
| 7,658,598 | B2 | * | 2/2010 | Reed | F04B 43/0736 417/395 |
| 7,805,940 | B2 | * | 10/2010 | Burkhardt | F02B 33/44 123/564 |
| 2003/0051486 | A1 | * | 3/2003 | Ursan | F04B 15/08 62/50.6 |
| 2004/0148932 | A1 | * | 8/2004 | Larson | B60T 17/02 60/628 |
| 2007/0193797 | A1 | * | 8/2007 | Shamis | F04B 9/127 180/165 |
| 2009/0188249 | A1 | * | 7/2009 | Cannata | B60K 6/12 60/413 |

\* cited by examiner

GAS COMPRESSION SYSTEM

CROSS-REFERENCE TO RELATED APPLICATIONS

This is the U.S. National Stage of PCT/EP2011/068996, filed Oct. 28, 2011, which in turn claims priority to French Patent Application No. 1059173, filed Nov. 5, 2010, the entire contents of all applications are incorporated herein by reference in their entireties.

The invention relates to a regulator for a gas compression system as well as a method of using such a system.

Different methods of compressing a gas are known, in particular with the aid of compression energy supplied by an electrical supply, by combustion of a fossil fuel or by a second gas called engine gas.

In this latter case, the principle of compression can be described with the aid of a compressor 100 (FIG. 1) which admits gas 102 to be compressed in a cylinder 104, a piston 106 sliding in this cylinder 104 in such a way as to reduce its volume and thus increase the pressure of admitted gas 102.

In order to control the sliding motions of piston 106, an engine gas 108 is admitted into a second cylinder 110, inside which piston 106 can also slide, thereby offering engine gas 108 a larger contact surface S108 than contact surface S102 offered to gas 102 to be compressed in compartment 104.

As a result, piston 106 is displaced between two cylinders 104 and 110 in order to maintain an equilibrium such that, for a pressure P108 in cylinder 110, it gives rise to a pressure P102 in cylinder 104 such that:

$$P108*S108=P102*S102.$$

During the compression phase of the gas to be compressed, it is thus possible to obtain a force applied on S108 that is much greater than that of the back-pressure at S102 and to perform the function of compressing gas 102 at very high pressures from a much smaller actuating pressure P108.

During the admission phase of the gas to be compressed, the reverse phenomenon is produced. Engine gas 108 is relieved of pressure, generally to atmospheric pressure, and gas to be compressed 102 is introduced into cylinder 104. The force applied on S102 is much greater than that of the back-pressure at S108 and makes it possible to perform the function of admitting gas to be compressed 102 and evacuating engine gas 108.

The linking of the admission and compression phases displaces piston 106 in an alternating back-and-forth movement.

Figure 2:
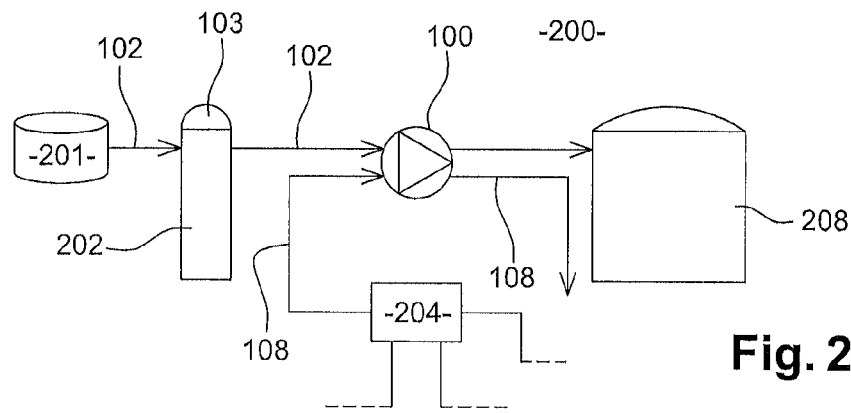

By reference to FIG. 2, it is known to use the previously described principle of compression by engine gas in a system 200 comprising a source 201 of gas 102 to be compressed combined with a buffer tank 202 making it possible to regulate the supply of compressor 100 with gas 102 to be compressed.

In effect, source of gas 201 to be compressed can deliver said gas 102 at a variable flow rate depending on the production capacity of the generator of gas to be compressed, such as for example a generator of hydrogen and oxygen by electrolysis of water or by reforming. Source 204 of engine gas 108 employs a pressure corresponding to the pressure of gas 108 in the distribution network to which compressor 100 is connected.

A pressure switch 103 measures the pressure of gas 102 present in buffer tank 202 in such a way as to trigger compressor 100 as soon as said pressure 102 reaches a threshold value. As soon as compressor 100 is triggered, the pressure of gas 102 present in buffer tank 202 diminishes, because production flow rate 201 is less than the output rate of the compressor. In this case, compressor 100 is stopped at a lower threshold in such a way as to increase said pressure of gas 102 by the admission at 202 of new gas. In other words, booster 100 operates jerkily. The displacement speed of its piston is high and requires a high engine gas consumption.

Moreover, the high displacement speed of the piston necessarily has an impact on the useful life of the compressor and the consumption of engine gas.

After its passage into compressor 100, compressed gas 102 is stored in a tank 208 at high pressure, this high pressure increasing at the same time as the compression of gas 102 in said tank 208.

In this context, the invention aims to solve the aforementioned problems encountered with the gas compression systems of the prior art. More particularly, the invention aims to propose a compression system, the energy efficiency whereof, i.e. the engine gas consumption whereof, is optimised and the useful life whereof is increased. For this purpose, the present invention relates to a gas compression system comprising a compressor provided with at least one first cylinder and one second cylinder combined together in such a way that a gas to be compressed admitted at an admission pressure into the first cylinder is compressed by the admission of an engine gas into the second cylinder, said system comprising means of checking the pressure of the engine gas during its introduction into the second cylinder, characterised in that the checking means comprise:

a pressure detector for measuring the pressure of the gas to be compressed during its admission into the first cylinder, and a regulator for adjusting the flow rate of the engine gas into the second cylinder in such a way that the pressure of the gas to be compressed is kept at a constant pressure during its admission into the first cylinder.

Thanks to the invention, the pressure in the buffer tank containing the gas to be compressed is kept constant during its admission into the first cylinder in such a way that the flow rate of the gas impelled by the compressor is equal to the flow rate of the gas produced at the source. Consequently, the displacements of the pressure transmission piston are constant at a minimal frequency.

More particularly, a minimal displacement frequency of the compressor piston confers on the compressor an increased useful life and minimal engine gas consumption, since the piston is displaced more slowly.

The system according to the invention can also have one or more of the following features, considered individually or in any technically possible combinations.

According to an advantageous embodiment, the system comprises a source of gas to be compressed located upstream of the first cylinder, the checking means comprising means for keeping the constant pressure of the gas to be compressed, upon entering the first cylinder, at a pressure equal to the production pressure of the source of the gas to be compressed.

Figure 3:
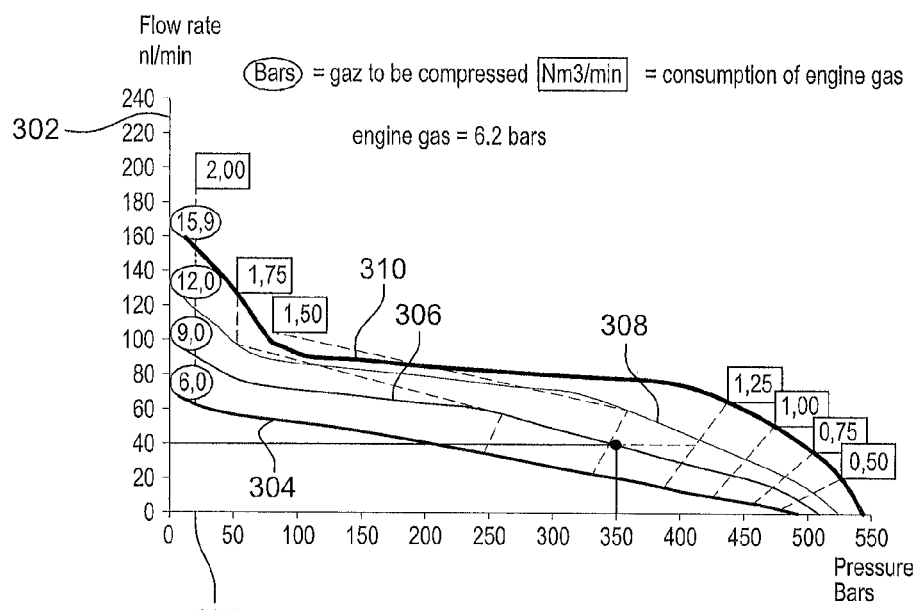

A maximum input pressure of the first cylinder (i.e. equal to the pressure of the source of gas to be compressed) is particularly advantageous, because it appears that the quantity of engine gas required to compress a gas diminishes when the pressure of the gas to be compressed increases, as represented in FIG. 3, which illustrates the pressure variation (axis of abscissas 300, in bars) of a compressed gas exiting from a compressor as a function of the flow rate (axis of the ordinates 302, in nl/min) of gas to be compressed upon entering the compressor—for one and the same pressure of the engine gas (6.2 bars) and for different pressures of the gas to be compressed, namely: 6 bars (curve 304), 9 bars (curve 306), 12 bars (curve 308) and 15.9 bars (curve 310).

Considering, for example, a flow rate of 42 nl/min of compressed gas, the consumption of the engine gas—represented in squares in $Nm^3$/min—is almost increased by 50% between a supply of gas to be compressed at 9 bars (1.5 $Nm^3$/min) and a supply of gas to be compressed at 12 bars (1.15 $Nm^3$/min).

It appears that the reduction in the consumption of engine gas improves the energy efficiency of the compressor, measured by a representative compression ratio of the energy transmitted by the engine gas to the gas to be compressed.

Typically, this compression efficiency can be defined in a compression cycle as the ratio between, on the one hand, the energy supplied to the gas to be compressed by the compressor and, on the other hand, the energy supplied to the compressor by the engine gas.

Moreover, when the gas to be compressed is kept, upon entering the compressor, at a constant pressure equal to the production pressure, the displacements of the pressure transmission piston are fewer in frequency. Thus, the useful life of the compressor is increased and the consumption of engine gas is minimal.

According to an embodiment, the checking means comprise a buffer tank of gas to be compressed, located downstream of the source of the gas to be compressed and upstream of the first cylinder, the pressure of the gas to be compressed being constant in said buffer tank. In order to maintain a constant pressure of the gas to be compressed in the buffer tank, the pressure of the engine gas is adjusted.

In an embodiment, the buffer tank is formed by distribution conduits for the gas to be compressed, the pressure of the gas to be compressed being constant in a section of said distribution conduits.

According to an embodiment, the pressure detector is combined with a probe located in the buffer tank.

In an embodiment, the system comprises means for maintaining a pressure of the gas to be compressed, upon entering the first cylinder, preferably between 5 and 30 bars.

According to an embodiment, the source of the gas to be compressed comprises a gas generator.

The invention also relates to a gas compression method employing a system according to any one of the preceding embodiments, this system comprising one first cylinder and one second cylinder combined together in such a way that a gas to be compressed admitted at an admission pressure into the first cylinder is compressed by the admission of an engine gas into the second cylinder, said system comprising means of checking the pressure of the engine gas during its introduction into the second cylinder, characterised in that it comprises the following steps:
  the step for a pressure detector to measure the pressure of the gas to be compressed during its admission into the first cylinder, and
  the step for a regulator to adjust the flow rate of engine gas in the second cylinder in such a way that the pressure of the gas to be compressed is constant during its admission into the first cylinder.

Figure 4:
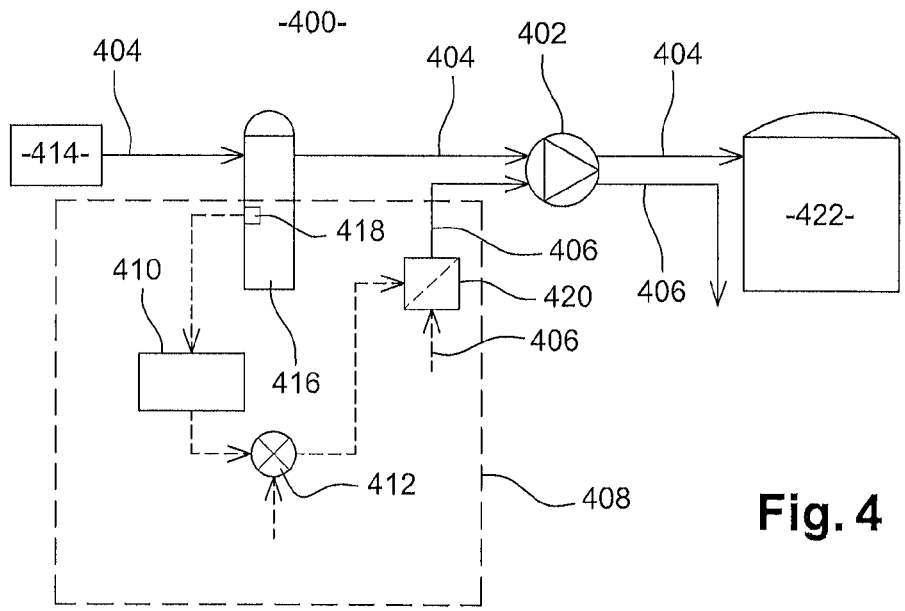
Figure 5:
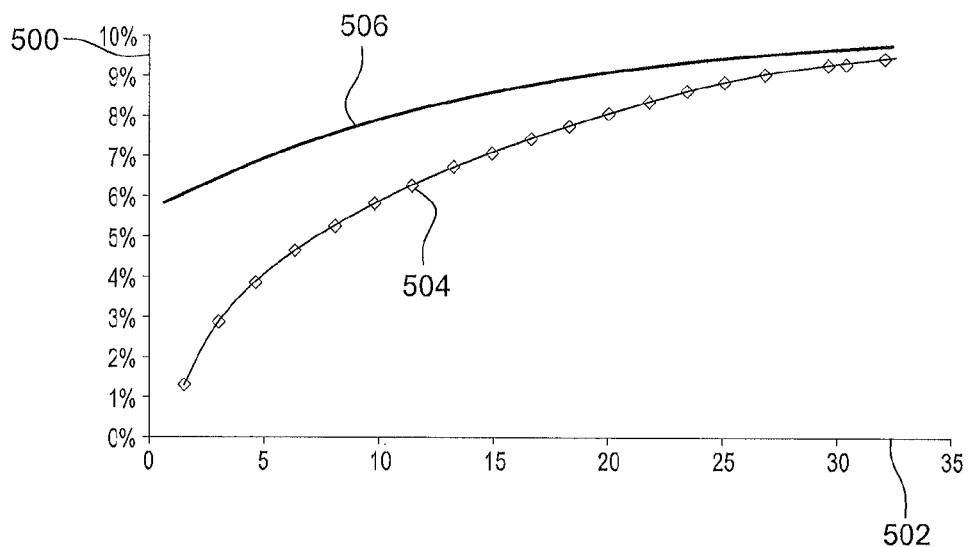

Other features and advantages of the invention will appear in the light of the following description, provided by way of illustration and not limiting, making reference to the appended figures, in which:

FIG. 1, already described, represents diagrammatically the functioning of a known gas compressor, FIG. 2, already described, represents diagrammatically the functioning of a known system provided with the compressor described in FIG. 1, FIG. 3 illustrates the variation in the consumption of engine gas as a function of the pressure and the flow rate of the gas compressed in a compressor as described in FIG. 1, FIG. 4 represents diagrammatically the functioning of a system according to the invention and FIG. 5 represents a comparison of the efficiency of a known system compared with a system according to the invention as a function of the compression ratio of the system.

Making reference to FIG. 4, this represents a gas compression system 400 according to the invention, i.e. provided with a compressor 402 comprising one first cylinder and one second cylinder combined together in such a way that a gas (404) to be compressed admitted at an admission pressure into the first cylinder is compressed by the admission of an engine gas (406) into the second cylinder, said system (400) comprising means (408) for checking the pressure of engine gas (406) during its introduction into the second cylinder.

Checking means 408 comprise:
  a pressure detector 410 for measuring the pressure of gas 404 to be compressed during its admission into the first cylinder, and
  a regulator 412 for adjusting the flow rate of engine gas 406 in the second cylinder in such a way that the pressure of gas 404 to be compressed is kept at a constant pressure during its admission into compressor 402.

In this embodiment, the source of gas 414 to be compressed comprises a gas generator, for example a chemical reactor (not represented) which employs, for example, an electrolysis reaction producing hydrogen as described by Øystein Ulleberg, Torgeir Nakken and Arnaud Eté in the publication "The wind/hydrogen demonstration system at Utsira in Norway: Evaluation of system performance using operational data and updated hydrogen energy system modeling tools", published on 15 Jan. 2010 in International Journal of Hydrogen Energy, pages 1841-1852.

Moreover, checking means 408 keep the pressure of gas 404 to be compressed constant and equal to the production pressure of source 414 of gas to be compressed as it enters the first cylinder of compressor 402.

For this purpose, checking means 408 comprise a buffer tank 416 of gas to be compressed, located downstream of source 414 of gas to be compressed and upstream of compressor 402, the pressure of gas 404 to be compressed being constant in said buffer tank 416.

In other variants not represented, buffer tank 416 can be formed by distribution conduits of the gas to be compressed, the pressure of the gas to be compressed being constant in a section of said distribution conduits connected to compressor 402.

In all the cases, probe 418, located in buffer tank 416, is connected to pressure detector 410, which allows the latter to determine the pressure of gas 404 upon entering the compressor and to inform controller 412 in order that the latter changes the flow rate of engine gas 406, via a command 420 on its distribution network, such that the pressure of gas 404 to be compressed, upon entering compressor 402, is kept constant and equal to the production pressure of source 414 of gas to be compressed.

Typically, system 408 makes it possible to maintain a minimal flow rate for engine gas consumption just necessary for the compression of the production flow rate supplied by source 414.

As represented in FIG. 5, efficiency 500 of a gas compression system as a function of compression ratio 502 equal to the ratio between the output pressure of the compressed gas and the pressure of the gas to be compressed upon entering the employed compressor increases significantly with a gas compression system according to the invention—curve 506—compared with a gas compression system according to the prior art—curve 504.

In this example, efficiency $\eta_{comp,H2}$ of the system is defined as a function of input pressure $P_{e,H2}$ and respectively output pressure $P_{s,H2}$ of the gas to be compressed—of hydrogen ($H_2$)—and its flow rate $\dot{n}_{H2}$ through the compressor.

Moreover, considering that the flow rate of the engine gas—of the air—$\dot{n}_{air}$ takes place with an input pressure $P_{e,air}$ and respectively an output pressure $P_{s,air}$ equal to 1 atmosphere by default, the efficiency of the system $\eta_{comp,H2}$ is:

$$\eta_{comp,H2} = \frac{\dot{n}_{H2}\left(\left(\frac{P_{e,H2}}{P_{s,H2}}\right)^{\frac{\gamma-1}{\gamma}} - 1\right)}{\frac{\dot{n}_{air}}{\rho_{compresseur,air}}\left(\left(\frac{P_{e,air}}{P_{s,air}}\right)^{\frac{\gamma-1}{\gamma}} - 1\right)}$$

compresseur = compressor where $\rho_{compressor,air}$ is the efficiency of the compressor having supplied the compressed air and $\gamma$ represents the isentropic ratio of the gas ($\gamma$ equals 1.4 for a diatomic gas: $H_2$, $O_2$, $N_2$ . . . ).

The present invention is capable of numerous variants, in particular relating to the use of different types of compressors—boosters, or any other equipment, provided with a variable number of cylinders making it possible to increase the pressure of a gas by transmission of energy from another compressed gas—the engine gas—typically nitrogen or air—and the compressed gas.

The present invention generally relates to all gas production systems, whereof the storage pressure at the exit from treatment is higher than the production pressure, typically the production of hydrogen ($H_2$) and oxygen ($O_2$) by the electrolysis of water with an intermittent energy source such as solar or wind energy.

In order that the system of the invention functions in the optimum manner, it is necessary that the pressure of the gas to be compressed, upon entering the first cylinder, is constant. Moreover, the higher this pressure, the more the consumption of engine gas by the compressor is reduced. Thus, thanks to the system of the invention, it is possible to keep a pressure of gas to be compressed, upon entering the first cylinder, constant and equal to (i.e. maximum) the production pressure of the source of gas to be compressed (i.e. the pressure of the gas generator of the source).

It should be noted that the maximum pressure upon entering into the compressor depends in particular on the employed type of source of gas to be compressed and more particularly on the employed type of generator of gas to be compressed (electrolyser HOGEN™ series S from the company "Proton Energy System" (14.8 bars), electrolyser HOGEN™ series H from the company "Proton Energy System" (30 bars), electrolyser HySTAT™-60 from the company Hydrogenics (10 bars), electrolyser GENHY 5000 from the company CETH (10 bars), electrolyser GENHY 100 from the company CETH (7 bars), . . . ).

A significant advantage of the invention is that it proposes a solution which minimises the energy consumption of the equipment used to compress the engine gas injected into the "booster" or compressor, i.e. that it improves the overall energy efficiency of the compression system, in particular at low compression ratios.

Moreover, this method makes it possible to optimise the useful life of the "booster" or compressor by imposing a minimum beating rate adjusted so as to react to the production rate of the source of gas to be compressed.

The gas compression system according to the invention finds particularly advantageous application in the area of the production of hydrogen and oxygen by the electrolysis of water.

The invention claimed is:

1. A gas compression system comprising:
a compressor provided with at least one first cylinder and one second cylinder combined together in such a way that a gas to be compressed admitted at an admission pressure into the first cylinder is compressed by the admission of an engine gas into the second cylinder; a pressure checking device configured to check the pressure of the engine gas during its introduction into the second cylinder, the pressure checking device comprising
a pressure detector configured to measure the pressure of the gas to be compressed during its admission into the first cylinder, and
a regulator configured to adjust a flow rate of engine gas into the second cylinder in such a way that the pressure of the gas to be compressed is constant during its admission into the first cylinder.

2. The system according to claim 1, comprising a source of gas to be compressed located upstream of the first cylinder.

3. The system according to claim 2, wherein the source of gas to be compressed comprises a gas generator.

4. The system according to claim 2, wherein the pressure checking device is configured to keep the constant pressure of the gas to be compressed, upon entering the first cylinder, at a pressure equal to the production pressure of the source of the gas to be compressed.

5. The system according to claim 2, wherein the pressure checking device comprises a buffer tank of gas to be compressed, located downstream of said source of the gas to be compressed and upstream of the first cylinder, the pressure of the gas to be compressed being constant in said buffer tank.

6. The system according to claim 5, wherein the buffer tank is formed by distribution conduits for the gas to be compressed, the pressure of the gas to be compressed being constant in a section of said distribution conduits.

7. The system according to claim 5, wherein the pressure detector is combined with a probe located in the buffer tank.

8. A gas compression method for compressing a gas with a system according to claim 1 the method comprising:
measuring the pressure of the gas to be compressed during its admission into the first cylinder with the pressure detector, and
adjusting the flow rate of engine gas into the second cylinder with the regulator in such a way that the pressure of the gas to be compressed is constant during its admission into the first cylinder.

* * * * *